US 11,740,833 B2

(12) United States Patent
Bavishi et al.

(10) Patent No.: US 11,740,833 B2
(45) Date of Patent: *Aug. 29, 2023

(54) THROTTLE RESPONSE SIGNALS FROM A MEMORY SYSTEM

(71) Applicant: Micron Technology, Inc., Boise, ID (US)

(72) Inventors: Dhawal Bavishi, San Jose, CA (US); Trevor Conrad Meyerowitz, Morgan Hill, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/199,302

(22) Filed: Mar. 11, 2021

(65) Prior Publication Data

US 2021/0200466 A1 Jul. 1, 2021

Related U.S. Application Data

(63) Continuation of application No. 16/058,293, filed on Aug. 8, 2018, now Pat. No. 10,969,994.

(51) Int. Cl.
*G06F 12/00* (2006.01)
*G06F 13/00* (2006.01)
*G06F 3/06* (2006.01)

(52) U.S. Cl.
CPC .......... *G06F 3/0656* (2013.01); *G06F 3/0604* (2013.01); *G06F 3/0679* (2013.01)

(58) Field of Classification Search
CPC ..... G06F 3/0656; G06F 3/0604; G06F 3/0679

USPC ........................................................ 711/154
See application file for complete search history.

(56) References Cited

U.S. PATENT DOCUMENTS

| 5,535,340 | A | * | 7/1996 | Bell | G06F 13/4027 710/310 |
| 5,862,338 | A | * | 1/1999 | Walker | H04L 49/351 709/224 |
| 6,006,289 | A | * | 12/1999 | James | G06F 13/28 370/431 |
| 6,457,143 | B1 | * | 9/2002 | Yue | H04L 43/50 714/43 |
| 6,665,088 | B1 | * | 12/2003 | Chiba | G06K 15/12 358/1.15 |

(Continued)

OTHER PUBLICATIONS

Throttle Response Signals from a Memory System, U.S. Appl. No. 16/058,293, filed Aug. 8, 2018, Dhawal Bavishi et al., Patented Case, Jan. 2, 2020.

(Continued)

*Primary Examiner* — Sheng Jen Tsai
(74) *Attorney, Agent, or Firm* — Greenberg Traurig

(57) ABSTRACT

A memory system having memory components and a processing device to: receive, from a host system, write commands to store data in the memory components; store the write commands in a buffer; execute at least a portion of the write commands; determine an amount of available capacity of the buffer that becomes available after execution of at least the portion of the write commands; receive, from the host system, a request for information about available capacity of the buffer; and determine whether to transmit a response signal corresponding to the request based at least in part on the amount of available capacity.

20 Claims, 5 Drawing Sheets

(56) References Cited

U.S. PATENT DOCUMENTS

| | | | |
|---|---|---|---|
| 7,249,222 B1* | 7/2007 | Bellis | G06F 12/0215 711/213 |
| 7,301,791 B2 | 11/2007 | Atwood et al. | |
| 7,573,753 B2 | 8/2009 | Atwood et al. | |
| 7,647,436 B1* | 1/2010 | Westrelin | G06F 13/00 710/33 |
| 9,552,323 B1* | 1/2017 | Finan | G06F 13/4282 |
| 10,969,994 B2* | 4/2021 | Bavishi | G06F 13/1673 |
| 11,074,007 B2 | 7/2021 | Meyerowitz et al. | |
| 2001/0011323 A1* | 8/2001 | Ohta | G06F 3/061 711/158 |
| 2002/0059476 A1* | 5/2002 | Yamada | G06F 3/0601 710/1 |
| 2002/0091965 A1* | 7/2002 | Moshayedi | G06F 11/004 714/6.13 |
| 2002/0108005 A1* | 8/2002 | Larson | G06F 13/387 710/52 |
| 2004/0193822 A1 | 9/2004 | Kareenahalli et al. | |
| 2005/0069292 A1 | 3/2005 | Yokota et al. | |
| 2006/0104283 A1* | 5/2006 | Suzuki | H04L 49/90 370/395.2 |
| 2007/0006070 A1* | 1/2007 | Baartman | G06F 16/958 715/234 |
| 2007/0077887 A1* | 4/2007 | Kuwabara | H04W 52/0274 455/39 |
| 2007/0180208 A1* | 8/2007 | Yamasaki | G06F 11/2074 714/E11.107 |
| 2007/0183198 A1 | 8/2007 | Otsuka et al. | |
| 2007/0186065 A1* | 8/2007 | Lee | G06F 3/0674 711/159 |
| 2007/0288672 A1* | 12/2007 | Asano | G06F 13/42 713/400 |
| 2008/0222330 A1* | 9/2008 | Shima | G06F 13/28 710/106 |
| 2009/0327535 A1 | 12/2009 | Liu | |
| 2011/0078393 A1 | 3/2011 | Lin | |
| 2012/0047320 A1 | 2/2012 | Yoo et al. | |
| 2012/0066432 A1* | 3/2012 | Miura | G06F 13/161 711/E12.001 |
| 2012/0221767 A1* | 8/2012 | Post | G06F 13/1673 711/E12.008 |
| 2012/0328038 A1* | 12/2012 | Ebisuzaki | H04L 67/1097 375/267 |
| 2013/0013853 A1* | 1/2013 | Yeh | G06F 12/0246 711/E12.008 |
| 2013/0283013 A1* | 10/2013 | Guok | G06F 15/163 712/214 |
| 2014/0181323 A1 | 6/2014 | Manula et al. | |
| 2014/0281338 A1* | 9/2014 | Choi | G06F 3/0688 711/170 |
| 2015/0262633 A1* | 9/2015 | Lee | G11C 5/04 710/308 |
| 2015/0363107 A1* | 12/2015 | Best | G11C 7/1066 711/105 |
| 2016/0062927 A1* | 3/2016 | Saga | G06F 13/1673 710/308 |
| 2016/0092120 A1 | 3/2016 | Liu | |
| 2016/0139807 A1 | 5/2016 | Lesartre et al. | |
| 2016/0211973 A1 | 7/2016 | Nale et al. | |
| 2016/0313943 A1* | 10/2016 | Hashimoto | G06F 3/0608 |
| 2016/0342548 A1 | 11/2016 | Hathorn et al. | |
| 2017/0192697 A1 | 7/2017 | Munetoh et al. | |
| 2017/0195401 A1* | 7/2017 | Shin | H04L 67/06 |
| 2017/0286337 A1* | 10/2017 | Wang | G06F 13/4004 |
| 2018/0032430 A1* | 2/2018 | Malladi | G06F 12/023 |
| 2018/0039441 A1* | 2/2018 | Nimura | G06F 3/0656 |
| 2018/0059945 A1* | 3/2018 | Helmick | G06F 3/061 |
| 2018/0059976 A1* | 3/2018 | Helmick | G06F 3/0659 |
| 2018/0081590 A1* | 3/2018 | Farahani | G06F 13/1673 |
| 2018/0157445 A1* | 6/2018 | Gissin | G06F 12/0246 |
| 2018/0188952 A1 | 7/2018 | Carlton et al. | |
| 2018/0188960 A1* | 7/2018 | Pico | G06F 12/121 |
| 2018/0246643 A1* | 8/2018 | Jenne | G06F 3/0659 |
| 2018/0246662 A1* | 8/2018 | Kim | G11C 11/406 |
| 2018/0285252 A1* | 10/2018 | Kwon | G06F 12/0848 |
| 2019/0018596 A1* | 1/2019 | Nemoto | G06F 3/0611 |
| 2019/0087332 A1* | 3/2019 | Jun | G06F 3/0659 |
| 2019/0129656 A1 | 5/2019 | Bains et al. | |
| 2019/0189210 A1* | 6/2019 | Farmahini Farahani et al. | G11C 7/1084 |
| 2019/0196716 A1* | 6/2019 | Xiao | G06F 3/064 |
| 2019/0220224 A1 | 7/2019 | Lu et al. | |
| 2020/0026457 A1* | 1/2020 | Silbermintz | G06F 3/0688 |
| 2020/0050390 A1 | 2/2020 | Bavishi et al. | |
| 2020/0050391 A1* | 2/2020 | Meyerowitz | G06F 3/0656 |
| 2021/0208780 A1 | 7/2021 | Walker et al. | |
| 2021/0349659 A1 | 11/2021 | Meyerowitz et al. | |

OTHER PUBLICATIONS

Optimize Information Requests to a Memory System, U.S. Appl. No. 16/058,645, filed Aug. 8, 2018, Trevor Meyerowitz et al., Notice of Allowance Mailed—Application Received in Office of Publications, dated May 18, 2020.

International Search Report and Written Opinion, PCT/US2019/043304, dated Nov. 7, 2019.

International Search Report and Written Opinion, PCT/US2019/043308, dated Nov. 7, 2019.

Extended European Search Report, EP19846233.5, dated Apr. 4, 2022.

Extended European Search Report, EP19847154.2, dated Apr. 4, 2022.

* cited by examiner

THROTTLE RESPONSE SIGNALS FROM A MEMORY SYSTEM

RELATED APPLICATION

The present application is a continuation application of U.S. patent application Ser. No. 16/058,293, filed Aug. 8, 2018, and entitled "Throttle Response Signals from a Memory System," the entire disclosure of which application is hereby incorporated herein by reference.

FIELD OF THE TECHNOLOGY

Embodiments of the disclosure relate generally to memory systems, and more specifically, relate to the throttling of response signals provided by a memory system.

BACKGROUND

A memory sub-system can be a storage system, such as a solid-state drive (SSD) or, a memory module, such as a non-volatile dual in-line memory module (NVDIMM), and can include one or more memory components that store data. The memory components can be, for example, non-volatile memory components and volatile memory components. In general, a host system can utilize a memory sub-system to store data at the memory components and to retrieve data from the memory components.

A standardized communication protocol allows the host system to communicate with the memory sub-system to store data and retrieve data.

For example, JEDEC (Joint Electron Device Engineering Council) Solid State Technology Association has proposed a "DDR5 NVDIMM-P Bus Protocol" for communications between a host system and an NVDIMM-P memory module. This protocol is described in detail by the JEDEC Committee Letter Ballot, Committee: JC-45.6, Committee Item Number 2261.13D, Subject: "Proposed DDR5 NVDIMM-P Bus Protocol", which is hereby incorporated by reference herein in its entirety.

BRIEF DESCRIPTION OF THE DRAWINGS

The present disclosure will be understood more fully from the detailed description given below and from the accompanying drawings of various embodiments of the disclosure.

DETAILED DESCRIPTION

At least some aspects of the present disclosure are directed to the throttling of response signals transmitted from a memory sub-system to a host system to reduce communication traffic and/or reduce power consumption. A memory sub-system is also hereinafter referred to as a "memory device". An example of a memory sub-system is a memory module that is connected to a central processing unit (CPU) via a memory bus, such as a dual in-line memory module (DIMM), a small outline DIMM (SO-DIMM), a non-volatile dual in-line memory module (NVDIMM), etc. Another example of a memory sub-system is a storage system, such as a solid-state drive (SSD). In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

In some computer systems, such as a host system and a memory sub-system that are connected using an NVDIMM-P bus, write commands to store data in the memory sub-system can be buffered in the memory sub-system for execution in a time period that is not predetermined. The host system can issue commands to request information from the memory sub-system, including the information indicative of the available capacity of the memory sub-system for accepting new write commands and their data. In some instances, responding to such requests may not generate useful results, such as when the memory sub-system does not currently have available capacity for allocation to the host system for sending new write commands. Sending a response that is merely indicative the lack of available capacity can result in inefficient use of communication resources and/or can increase power consumption.

At least some aspects of the present disclosure address the above and other deficiencies by the memory sub-system selectively delaying and/or skipping the transmission of a response signal to requests for information indicative of the available capacity of the memory sub-system for accepting new write commands and their data.

Figure 1:
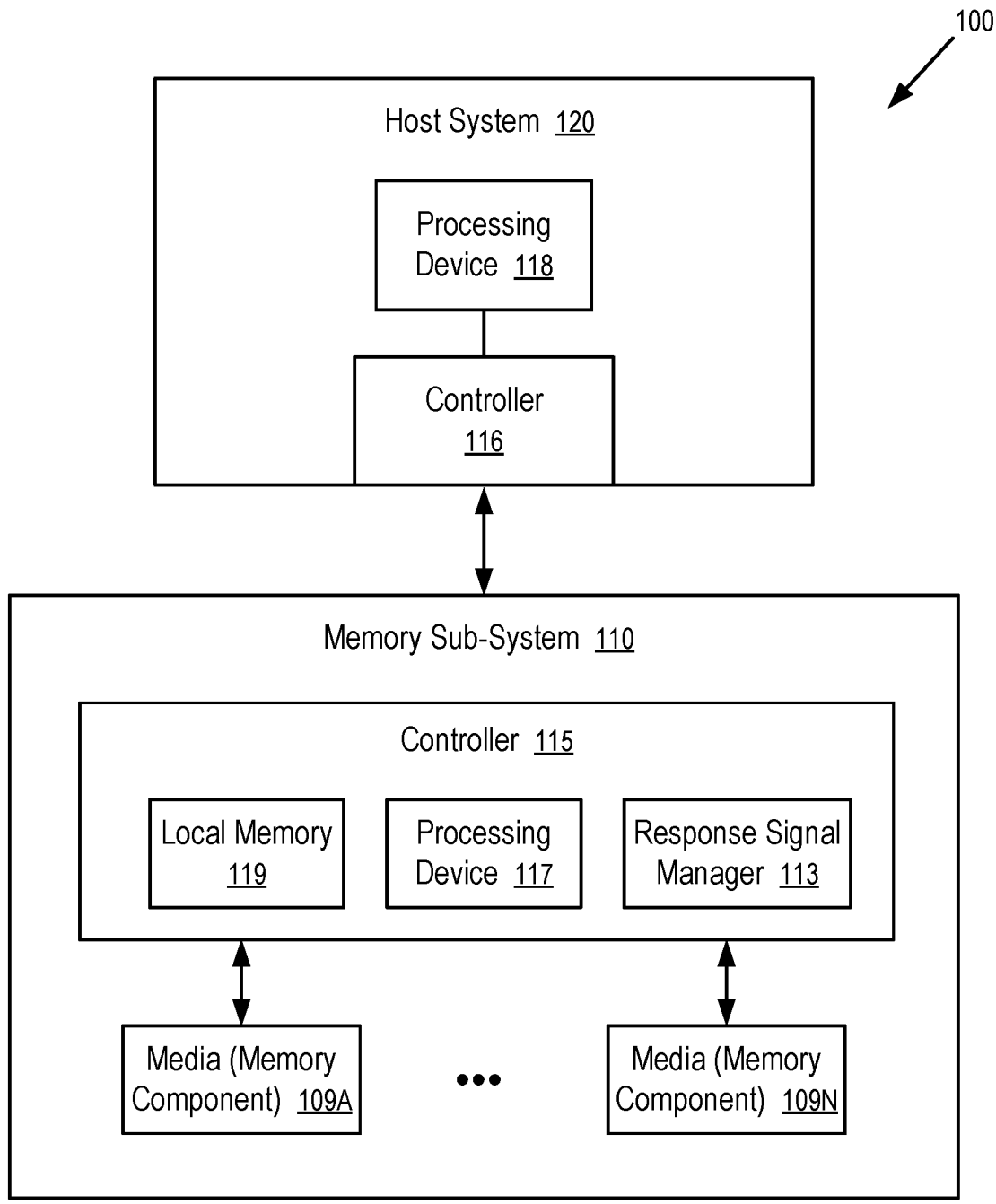
FIG. 1 illustrates an example computing system having a memory sub-system in accordance with some embodiments of the present disclosure.

FIG. 1 illustrates an example computing system 100 having a memory sub-system 110 in accordance with some embodiments of the present disclosure. The memory sub-system 110 can include media, such as memory components 109A to 109N. The memory components 109A to 109N can be volatile memory components, non-volatile memory components, or a combination of such. In some embodiments, the memory sub-system 110 is a memory module. Examples of a memory module includes a DIMM, NVDIMM, and NVDIMM-P. In some embodiments, the memory sub-system is a storage system. An example of a storage system is an SSD. In some embodiments, the memory sub-system 110 is a hybrid memory/storage sub-system. In general, the computing environment can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data between the host system 120 and the memory sub-system 110. The host system 120 can further utilize an NVM Express (NVMe) interface to access the memory components 109A to 109N when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The host system 120 includes a processing device 118 and a controller 116. The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110.

In general, the controller 116 can send commands or requests to the memory sub-system 110 for desired access to memory components 109A to 109N. The controller 116 can further include interface circuitry to communicate with the memory sub-system 110. The interface circuitry can convert responses received from memory sub-system 110 into information for the host system 120.

The controller 116 of the host system 120 can communicate with controller 115 of the memory sub-system 110 to perform operations such as reading data, writing data, or erasing data at the memory components 109A to 109N and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory components 109A to 109N can include any combination of the different types of non-volatile memory components and/or volatile memory components. An example of non-volatile memory components includes a negative-and (NAND) type flash memory. Each of the memory components 109A to 109N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 109A to 109N can be based on any other type of memory such as a volatile memory. In some embodiments, the memory components 109A to 109N can be, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 109A to 109N can be grouped as memory pages or data blocks that can refer to a unit of the memory component used to store data.

The controller 115 of the memory sub-system 110 can communicate with the memory components 109A to 109N to perform operations such as reading data, writing data, or erasing data at the memory components 109A to 109N and other such operations (e.g., in response to commands scheduled on a command bus by controller 116). The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processing device 117 (processor) configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 109A to 109N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 109A to 109N. The controller 115 can further include host interface circuitry to communicate with the host system 120 via the physical host interface. The host interface circuitry can convert the commands received from the host system into command instructions to access the memory components 109A to 109N as well as convert responses associated with the memory components 109A to 109N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 109A to 109N.

The computing system 100 includes a response signal manager 113 in the memory sub-system 110 that is configured to throttle response signals generated by the memory sub-system 110 by adjusting the speed at which such response signals are generated. In some embodiments, the controller 115 in the memory sub-system 110 includes at least a portion of the response signal manager 113. For example, the controller 115 can include logic circuitry implementing the response signal manager 113. For example, the controller 115 can include a processing device 117 (processor) configured to execute instructions stored in local memory 119 for performing the operations of the response signal manager 113 described herein. In some embodiments, the response signal manager 113 is part of an operating system of the host system 120, a device driver, or an application.

The response signal manager 113 of the memory sub-system 110 throttles the generation of response signals that are responsive to requests, from the host system 120, for the allocation of available buffer capacity in the memory sub-system for new write commands and their data. The response signal manager 113 selectively delaying and/or skipping the generation, and/or the transmission, of a response signal, based on whether the buffer capacity available for allocation to new write commands is above a threshold. Such throttling of response signals can improve efficiency in the usage of communication resources, such as the bus between the host system 120 and memory sub-system 110. Furthermore, respond signal throttling can result in reduced power consumption by eliminating and/or combining certain communications. Further details with regards to the operations of the response signal manager 113 are described below.

Figure 2:
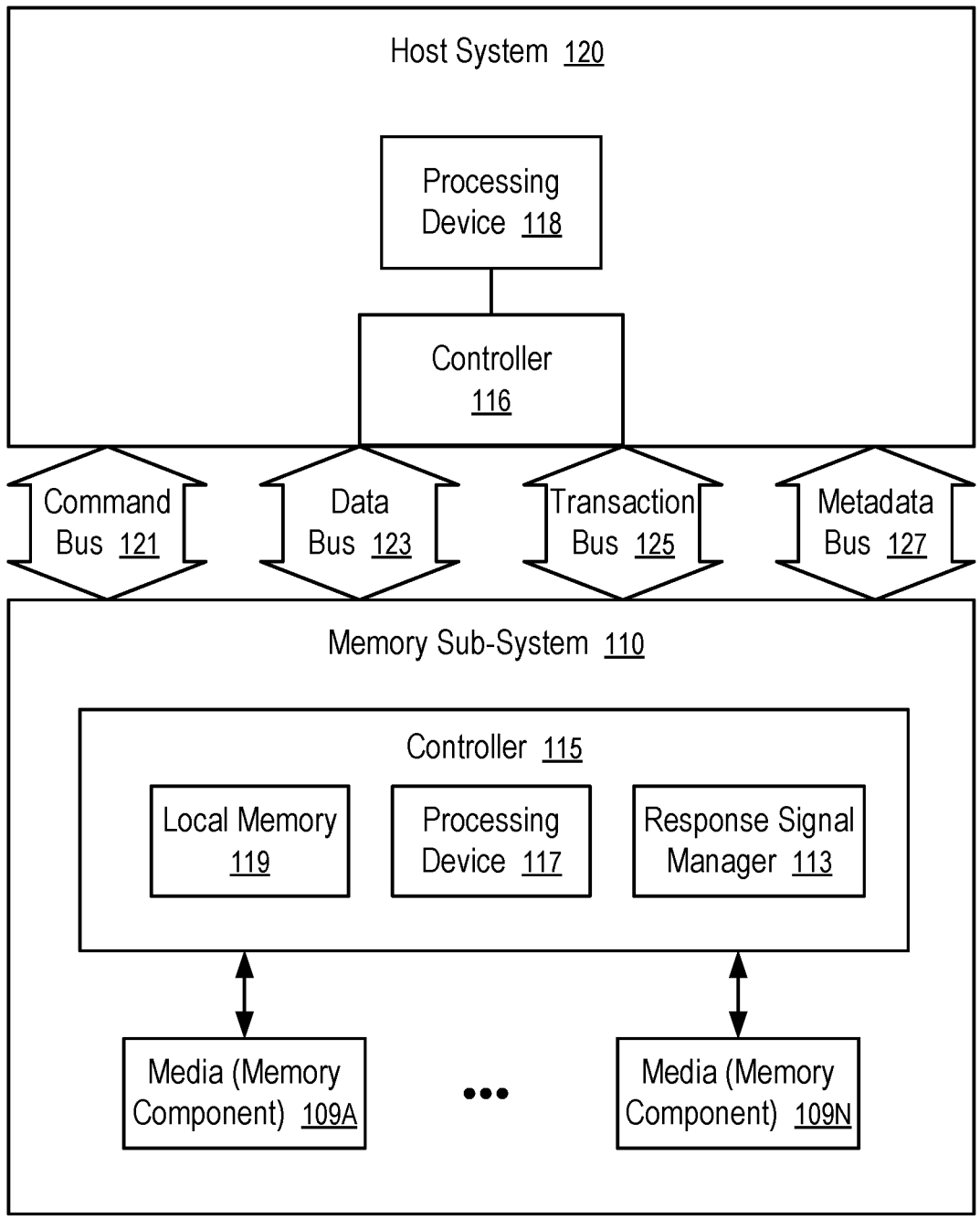
FIG. 2 illustrates an example computing system that includes a response signal manager in accordance with some embodiments of the present disclosure.

FIG. 2 illustrates an example computing system that includes a response signal manager 113 in accordance with some embodiments of the present disclosure.

Merely for non-limiting purposes of illustration in describing FIG. 2, the controller 116 of the host system 120 is sometimes referred to below as memory controller 116, and the controller 115 of the memory sub-system 110 is sometimes referred to below as media controller 115.

In FIG. 2, the communication channel between the host system 120 and the memory sub-system 110 includes the command bus 121, a data bus 123, a transaction bus 125, and a metadata bus 127. A communication protocol for the communication channel allows asynchronous access to the memory sub-system 110 for data storage and retrieval by the host system 120. For example, the memory sub-system 110 can be an NVDIMM; and the host system 120 can access the memory controller 116 in accordance with a JEDEC NVDIMM-P Bus Protocol using the command bus 121, the data bus 123, the transaction bus 125, and the metadata bus 127.

For example, the memory controller 116 can issue a write command to store data in the memory sub-system 110. After a fixed and predetermined time window from the transmission of the write command on the command bus 121, the memory controller 116 starts transmitting the data on the data bus 123. The memory sub-system 110 is not required to complete the operations of the write command within a predetermined time period. Examples of such a write command include XWRITE and PWRITE identified in the JEDEC NVDIMM-P Bus Protocol.

For example, the memory controller 116 can issue a read command to request information from the memory sub-system 110. The memory sub-system 110 is not required to generate a response within a predetermined time window from the read command. Examples of such a read command include XREAD and SREAD identified in the JEDEC NVDIMM-P Bus Protocol. An XREAD can be given a predetermined read ID to indicate that it is an information request (status_read) that will return system state, but won't access the media directly.

In response to the read command, the memory sub-system 110 prepares data that is requested by the read command. For example, the media controller 115 can retrieve data from media (e.g., 109A, . . . , or 109N) and buffer the retrieve data in the local memory 119 or another memory such that the data can be successfully transmitted to the memory controller 116 within a predetermined time window when such a transmission is requested.

When the requested data is ready for transmission, the memory sub-system 110 can provide a response signal in the transaction bus 125. When the memory controller 116 is informed of the readiness of the memory sub-system 110 to transmit certain data, the memory controller 116 can provide a send command to request the memory sub-system 110 to start transmitting data on the data bus 123 within a predetermined time window from the send command. When responding to the send command, the memory sub-system 115 can also send transaction status information, such as read ID identifying the corresponding read command, write credit information as further discussed below, metadata corresponding to the transaction, and/or error correction code (ECC). An example of such a send command is SEND identified in the JEDEC NVDIMM-P Bus Protocol.

The memory sub-system 110 can buffer read commands and write commands received from the command bus 121 in the local memory 119 or another memory. The media controller 115 can execute the buffered commands in an order different from the order in which the commands are received.

The memory sub-system 110 has a certain amount of capacity for buffering pending read commands and write commands and their associated data. The memory controller 116 and the media controller 115 can communicate with each other to prevent buffer overflow in the memory sub-system 110.

For example, a write credit can be used to represent a unit of buffer capacity that is available for buffering a write command and its associated data of a predetermined size. In some instances, a write command can have data larger than the predetermined size; and such a write command requires multiple write credits for buffering the command and its data in the memory sub-system 110.

The memory controller 116 can maintain a count of write credits it can use to transmit write commands on the command bus 121 to the memory sub-system 110. When a write command is sent over the command bus 121, the memory controller 116 deducts the write credits used by the write command. To avoid buffer overflow, the memory controller 116 should not transmit a write command when the memory controller 11 does not have sufficient write credits for transmitting the write command to the memory sub-system 110.

The media controller 115 can maintain a count of write credits it can return to the memory controller 116 for completed write commands. After a write command buffered in the memory sub-system 110 is completed, the buffer space used by the write command can be freed to accept further write commands from the memory controller 116. The write credits used by the write command that has been completed can be added to the count of write credits that can be returned to the memory controller 116.

The memory sub-system 110 can use the metadata bus 127 to specify the number of write credits it is returning to the memory controller 116. For example, after sending a response signal on the transaction bus 125 to enable the memory controller 116 to issue a send command, the media controller 115 can transmit the number of returned write credits using the metadata bus 127. The memory sub-system 110 can transmit such a response signal in response to a read command, such as XREAD and SREAD identified in the JEDEC NVDIMM-P Bus Protocol. An example of the response signal is RSPx_n identified in the JEDEC NVDIMM-P Bus Protocol.

When the memory controller 116 uses a read command to request retrieval of data from an address, the memory controller 116 can place an address command immediately following the read command to specify the address. Similarly, when the memory controller 116 uses a write command to store data at an address, the memory controller 116 can place an address command immediately following the write command to specify the address. An example of such an address command is XADR identified in the JEDEC NVDIMM-P Bus Protocol.

The memory controller 116 of the host system 120 has a counter of write credits at the host system 120 representing the amount of buffer space known to be available in the memory sub-system 110 to buffer write commands transmitted from the host system 120.

When the host system 120 transmits a write command to the memory sub-system, the memory controller 116 of the host system 120 reduces its counter of write credits at the host system 120 by an amount corresponding to a buffer capacity occupied by the write command and its data. When the host system 120 does not have sufficient write credits to transmit a write command, the host system 120 does not transmit the command to avoid buffer overflow at the memory sub-system 110.

The memory sub-system 110 includes a response signal manager 113 that is operable to monitor the write buffer(s) that can be located in the local memory 119 or another memory in the memory sub-system 110. A total count of write credits at the memory sub-system 110 identifies the total buffer capacity available for allocation to the host system 120 for transmitting write commands from the host system 120 to the memory sub-system 110. The total count of write credits at the memory sub-system 110 can be reduced by the write credits transmitted from the memory sub-system 110 to the host system 120. The transferred write credits represent the amount of buffer capacity that is allocated for use by the host system 120 to send new write commands. After the write command is executed and cleared from the buffer, the total count of write credits can be increased by the amount of write credits corresponding to an amount of buffer space occupied by the write command in the buffer. When a write command is buffered, the amount of buffer space occupied by the write command in the buffer identifies the amount of write credits used by the write command. The amount of write credits can be determined based on the size of the data associated with the write command. The total count of write credits at the memory sub-system 110 can be reduced by the write credits transmitted from the memory sub-system 110 to the host system 120. The transferred write credits represent the amount of buffer capacity that is allocated for use by the host system 120 to send new write commands. After a write command is executed and/or cleared from the buffer, the total count of write credits can be increased by the amount of write credits used by the write command.

The host system 120 can receive write credits from the memory sub-system 110; and the write credits in the host system 120 indicate an amount of buffer capacity that is allocated for the host system 120 to transmit write commands. Typically, write credits are transmitted from the memory sub-system 110 to the host system 120 as a response to an information request from the host system 120.

When the memory sub-system 110 receives such an information request, the response signal manager 113 determines whether the memory sub-system 110 has more than a threshold number of write credits that can be transferred to the host system 120. If the total count of write credits at the memory sub-system 110 is currently less than the threshold number, the response signal manager 113 delays the transmission of a response signal for the information request.

Optionally, the response signal manager 113 calculates the moving average of time periods between receiving prior information requests and transmitting response signals that provide write credits no less than the threshold number in response to the prior information requests. In response to a current information request from the host system 120, the memory sub-system 110 can postpone checking or rechecking whether the total count of write credits at the memory sub-system 110 is above the threshold number until after the expiration of the moving average of the time periods.

Alternatively, in response to an information request from the host system 120 and a determination that the total count of write credits at the memory sub-system 110 is below the threshold number, the memory sub-system 110 can delay a period of time according to the moving average of time periods and then transmit a response signal for the request without checking again whether the total count of write credits at the memory sub-system 110 is above the threshold.

Alternatively, in response to an information request from the host system 120 and a determination that the total count of write credits at the memory sub-system 110 is below the threshold number, the memory sub-system 110 can delay a period of time according to the moving average of time periods, or until one or more write commands have been completed and cleared out of the buffer, and then again check whether the total count of write credits at the memory sub-system 110 is below the threshold number.

If the memory sub-system 110 has multiple pending information requests, the response signal manager 113 can optionally cause the media controller 115 to skip some of the pending information requests and keep some of the pending information request.

Thus, the response signal manager 113 can combine and/or reduce communication traffics related to the available capacity for buffering write commands and reduce power consumption associated with the reduced communication traffics.

Figure 3:
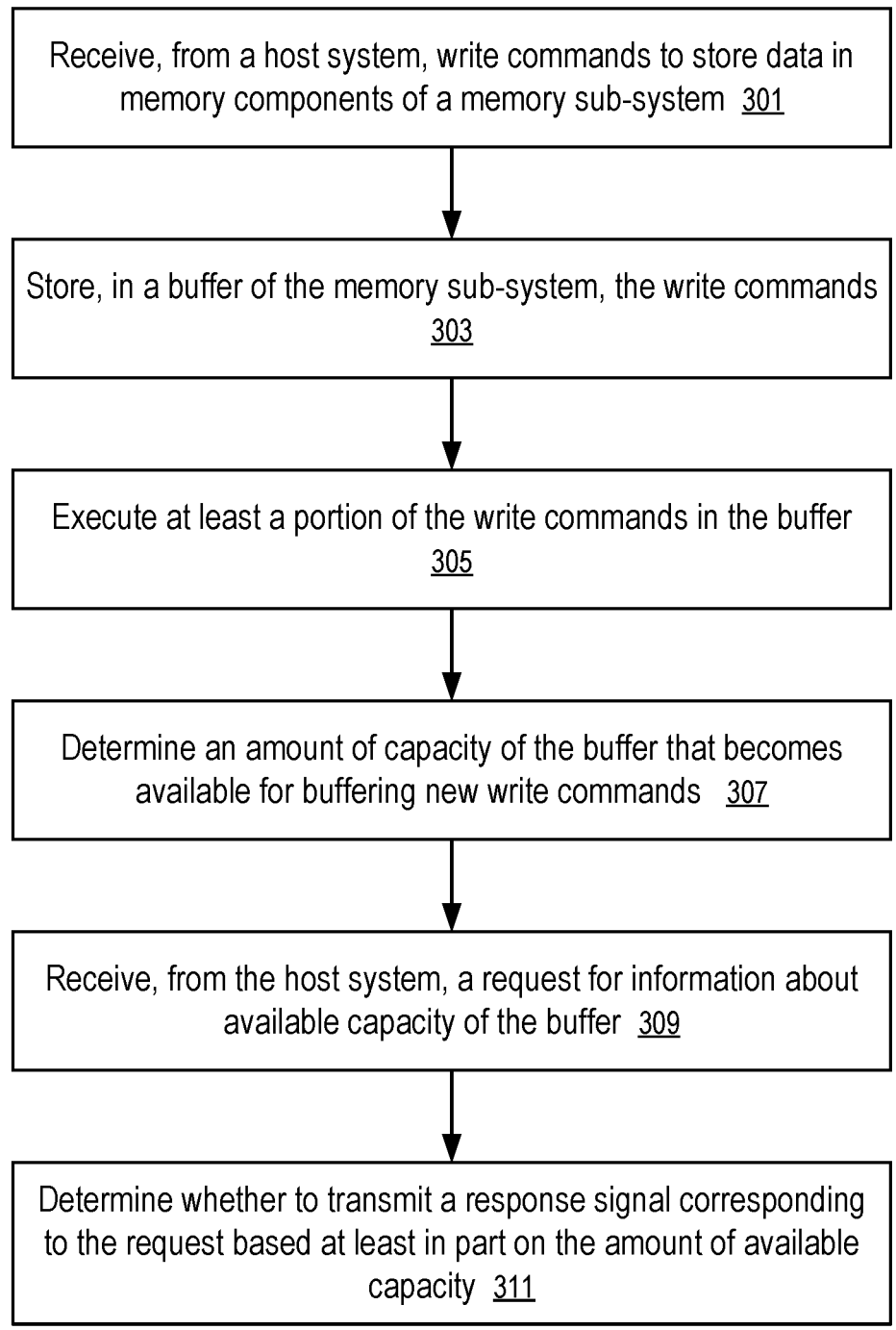
FIG. 3 is a flow diagram of an example method to throttle response signals from a memory sub-system to a host system in accordance with some embodiments of the present disclosure.

FIG. 3 is a flow diagram of an example method to throttle response signals from a memory sub-system to a host system in accordance with some embodiments of the present disclosure. The method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 is performed at least in part by the response signal manager 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 301, the media controller 115 receives, from the host system 120, write commands to store data in memory components 109A to 109N of the memory sub-system 110.

At block 303, the media controller 115 stores the write commands in a buffer of the memory sub-system 110. For example, the buffer can be implemented in the local memory 119 or another memory.

At block 305, the media controller 115 executes at least a portion of the write commands in the buffer. Upon completion of the execution of the write commands, the write commands and their data can be cleared from the buffer; and thus, the media controller 115 can make the buffer capacity previously used by the write commands available for receiving write commands.

At block 307, the response signal manager 113 determines an amount of capacity of the buffer that becomes available for buffering new write commands. The amount can be in the form of write credits, where each write credit represents a predetermined amount of buffer capacity usable for buffering a write command and/or its data.

At block 309, the media controller 115 receives, from the host system 120, a request for information about available capacity of the buffer. An example of such a request is status_read identified in the JEDEC NVDIMM-P Bus Protocol.

At block 311, the response signal manager 113 determines whether to transmit a response signal corresponding to the request based at least in part on the amount of available capacity. An example of such a response signal is RSPx_n identified in the JEDEC NVDIMM-P Bus Protocol.

For example, the response signal manager 113 can delay or skip responding to the request for information about available capacity of the buffer when the amount of available capacity is below a threshold.

Figure 4:
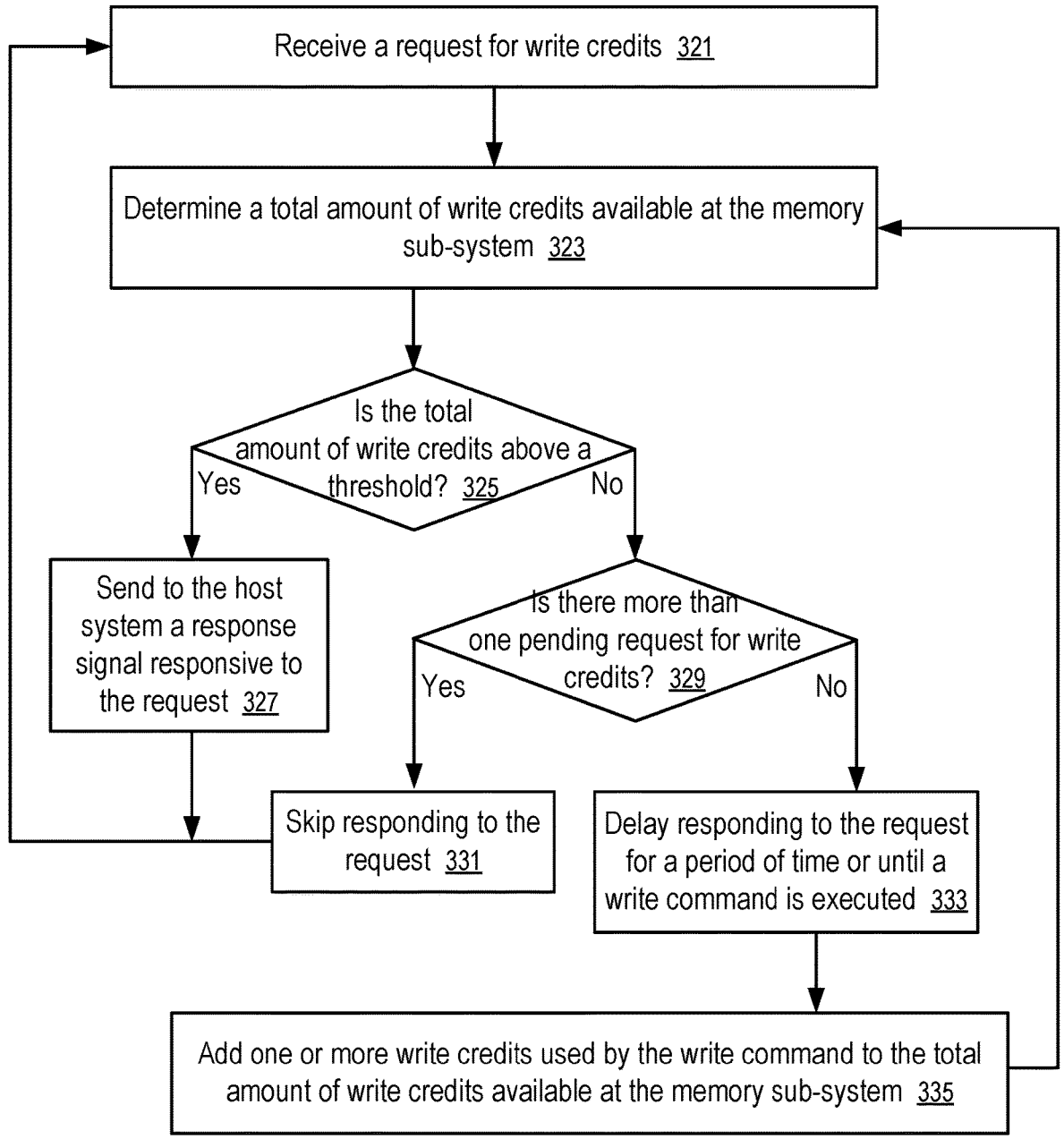
FIG. 4 is a flow diagram of a detailed example method to throttle response signals in accordance with some embodiments of the present disclosure.

FIG. 4 is a flow diagram of a detailed example method to throttle response signals in accordance with some embodiments of the present disclosure. The method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 4 is performed at least in part by the response signal manager 113 of FIG. 1 or 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 321, the memory sub-system 110 receives a request for write credits from the host system 120. An example of the request for write credits is status_read identified in the JEDEC NVDIMM-P Bus Protocol.

At block 323, the response signal manager 113 determines a total amount of write credits available at the memory sub-system 110. The available write credits can be transferred to the host system 120 by responding to the request. The number of transferred write credits identifies the amount of buffer capacity that can be used to buffer write commands transmitted from the host system 120 to the memory sub-system 110 using the command bus 121.

At block 325, the response signal manager 113 determines whether the total amount of write credits is above a threshold.

At block 327, if the total amount of write credits is above the threshold, the response signal manager 113 causes the memory sub-system 110 to send to the host system 120 a response signal that is responsive to the request or another read request.

An example of the response signal is RSPx_n identified in the JEDEC NVDIMM-P Bus Protocol, which can cause the host system to retrieve from the memory sub-system 110 information about write credits the memory sub-system 110 can return to the host system 120.

A response signal can be transmitted in response to a read command from the host system 120. Some read commands request data from addresses specified by the read commands, such as SREAD or XREAD in the JEDEC NVDIMM-P Bus Protocol. Other read commands are specific in requesting available write credits, such as status_read in the JEDEC NVDIMM-P Bus Protocol. The response signal manager 113 can cause transmission of write credits to the host system 120 using a response signal to a read command in general, and can drop certain read requests (e.g., status_read) that only request for write credits.

In some instances, when the response signal sent 327 is responsive to a read command that requests data from an address specified in connection with the read command, the responsible signal manager 117 can cause the media controller to provide the data retrieved from the address in response to the host system 120 provides a send command on the command bus 121 to retrieve the data requested by the read command and provide the write credits on the metadata bus 127.

When the write credits are sent to the host system 120 in connection with the transmission of data retrieved from an address of a read command, the response signal manager 113 can optionally cause the media controller 115 to drop the request for write credits.

At block 329, if the total amount of write credits is not above the threshold, the response signal manager 113 determines whether there is more than one pending request for write credits.

At block 331, if there is more than one pending request for write credits, the response signal manager 113 can skip responding to the request for write credits.

In general, the response signal manager 113 can implement a set of policies for skipping requests that are specific for requesting write credits. For example, when a read command is pending and can be used to transmit write credits to the host system 120, the response signal manager 113 can drop the request for write credits and/or all pending requests for write credits.

At block 333, if there is no more than one pending request for write credits, the response signal manager 113 can delay responding to the request for write credits for a period of time or until execution of a write command is completed.

The length of the delay period can be predetermined (e.g., based on statistic data of when sufficient write credits can become available to allow the response signal manager 113 to send 327 the response signal to the host system 120 for the transfer of write credits.

Alternatively, the response signal manager 113 can dynamically determine or optimize the delay period using an average of previous time periods between receiving previous requests for write credits and previously response signals that are send in response to a determination that the total amount of write credits is above the threshold. For example, the response signal manager 113 can compute a running average of a number of most recent time periods for sending the response signals.

In certain embodiments, the delay period is fixed at setup time for the memory sub-system 110. In some embodiments, the delay period is a configurable parameter. In some embodiments, the delay period can be adjusted or set based on one or more of the following factors: (a) a moving average of the speed at which write credits become available in the memory sub-system 110; (b) the current amount of total write credits; and/or (c) the threshold for the total amount of write credits. For example, if the current amount of total write credits is close to the threshold, the response signal manager 113 can reduce the delay period. For example, the response signal manager 113 can predict the time to reach the threshold for the total amount of write credits based on the moving average of the speed in gaining write credits and use the predicted time to set the delay period.

At block 335, after execution of a write command is completed, the response signal manager 113 can add one or more write credits used by the write command to the total amount of write credits available at the memory sub-system 110.

If no write command is completed during the delay period, no write credits can be added to the total amount of write credits available at the memory sub-system 120.

In some instances, after the delay period, the response signal manager 113 can send the response signal, responsive to the request for write credits, without checking again whether the total amount of available write credits is amount the threshold.

In response to the response signal sent 327 from the memory sub-system 110, the controller 116 of the host system 120 can perform operations to retrieve information identifying write credits returned from the memory sub-system 110.

For example, the memory controller 116 of the host system 120 can retrieve a write credit increment transmitted on the metadata bus 127 and add the increment to the total write credits at the host system 120.

For example, the memory controller 116 of the host system 120 can transmit a send command on the command bus 121 to instruct the controller 115 of the memory sub-system 110 to transmit information and/or data to the host system 120, including the write credit increment indicative of write credits transferred from the memory sub-system 110 to the host system 120.

In some implementations, the write credit increment can be transmitted from the memory sub-system 110 to the host system 120 using the metadata bus 127 without requiring the host system 120 to issue a send command on the command bus 121.

Figure 5:
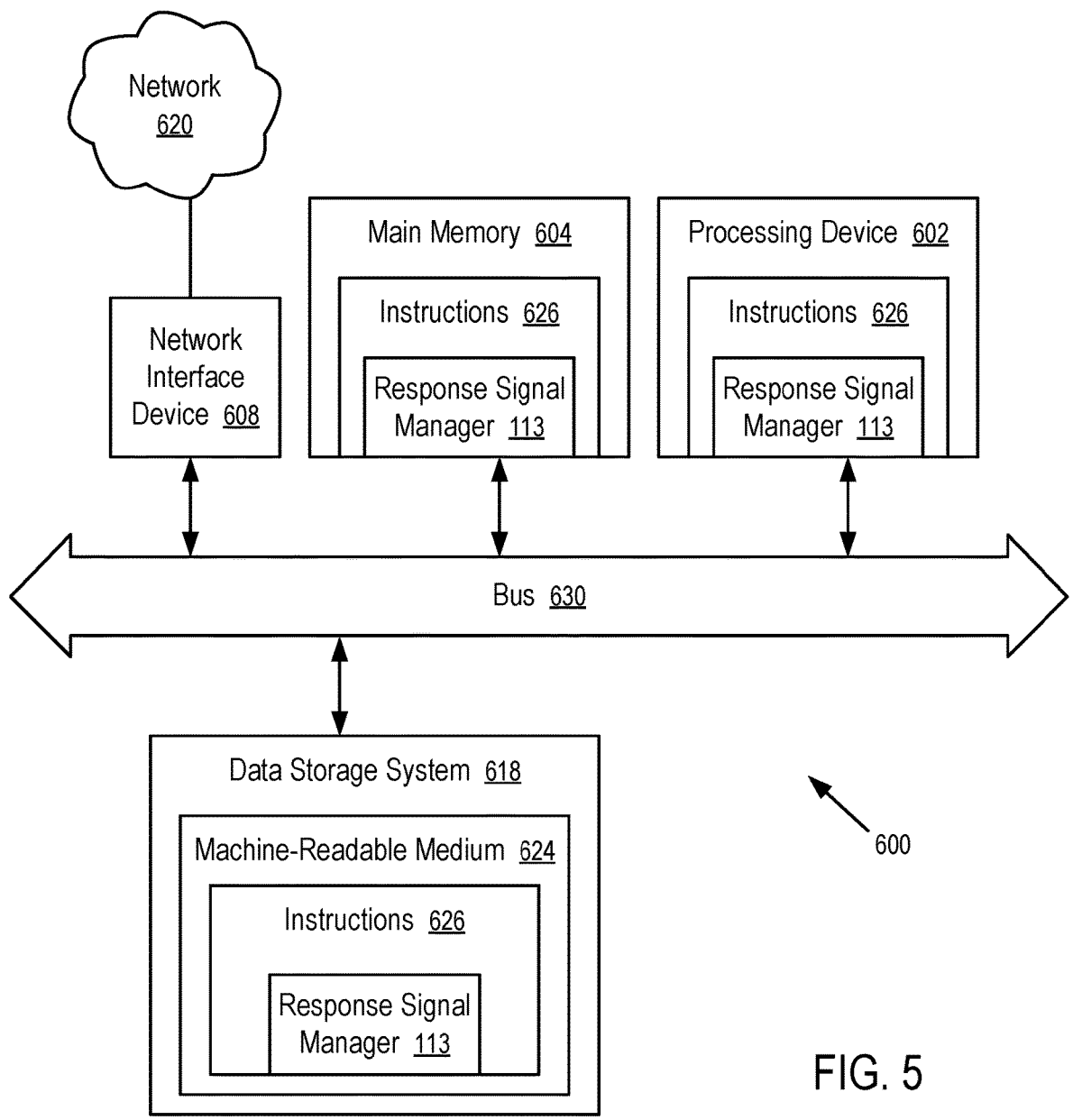
FIG. 5 is a block diagram of an example computer system in which embodiments of the present disclosure can operate.

FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a response signal manager 113 (e.g., to execute instructions to perform operations corresponding to the response signal manager 113 described with reference to FIGS. 1, 2, 3, and 4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 618, which communicate with each other via a bus 630 (which can include multiple buses).

Processing device 602 represents one or more general-purpose processing devices such as a microprocessor, a central processing unit (CPU), or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), a graphics processing unit (GPU), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a response signal manager 113 (e.g., a response signal manager 113 described with reference to FIGS. 1, 2, 3, and 4). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A memory system, comprising:
a plurality of memory components; and
a processing device, operatively coupled with the plurality of memory components, to:
receive, from a host system, write commands to store data in the memory components;
store the write commands in a buffer;
execute at least a portion of the write commands;
determine an amount of available capacity of the buffer that becomes available after execution of at least the portion of the write commands;
receive, from the host system, a request for information about available capacity of the buffer;
store, in the memory system, pending requests for information about available capacity of the buffer; and
determine whether to transmit a response signal corresponding to the request based at least in part on the amount of available capacity.

2. The memory system of claim 1, wherein the processing device is further to:
in response to a determination that the amount of available capacity is below a threshold, delay a period of time before transmitting the response signal corresponding to the request.

3. The memory system of claim 2, wherein the processing device is further to:
calculate the period of time based at least in part on a moving average of previous time periods between receiving information requests and transmitting of response signals for the information requests.

4. The memory system of claim 3, wherein each of the response signals for the information requests is transmitted in response to a determination that an available capacity is above the threshold.

5. The memory system of claim 1, wherein the write commands, the request, and the response signal are in accordance with a communication protocol for non-volatile dual in-line memory modules.

6. The memory system of claim 5, wherein the memory components include non-volatile memory; the memory system is coupled to the host system via:
   a command bus to transmit the write commands;
   a data bus to transmit the data requested to be stored by the write commands; and
   a transaction bus to transmit the response signal from the memory system to the host system.

7. The memory system of claim 1, wherein the processing device is further to:
   skip responding to the request for information in response to a determination that the plurality of pending requests are stored in the memory system and the amount of available capacity is below a threshold.

8. The memory system of claim 1, wherein the processing device is further to:
   delay a period of time before determining whether the amount of available capacity is above a threshold.

9. A method, comprising:
   receiving, in a memory system coupled to a host system via a communication channel, a request for information about available capacity of a buffer in the memory system, wherein the memory system stores in the buffer write commands, received from the host system to store data in memory components of the memory system, before execution of the write commands;
   determining, by a controller of the memory system, an amount of available capacity of the buffer that becomes available as a result of completing at least one write command previously stored in the buffer;
   controlling a response to the request based at least in part on the amount of available capacity; and
   skipping at least one of the plurality of requests.

10. The method of claim 9, further comprising:
    skipping at least one of the plurality of requests in response to a determination that a plurality of requests for information are buffered in the memory system and the amount of available capacity is below a threshold.

11. The method of claim 9, wherein the controlling comprises:
    delaying a period of time before transmitting, from the memory system to the host system, a response signal responsive to the request, in response to a determination that the amount of available capacity is below a threshold.

12. The method of claim 11, further comprising:
    calculating the period of time based at least in part on a moving average of previous time periods between receiving information requests and transmitting of response signals for the information requests.

13. The method of claim 12, wherein each of the response signals for the information requests is transmitted in response to a determination that an available capacity is above the threshold.

14. The method of claim 11, wherein the write commands and the response signal are in accordance with a communication protocol for non-volatile dual in-line memory modules; and communication channel includes:
    a command bus to transmit the write commands;
    a data bus to transmit the data requested to be stored by the write commands; and
    a transaction bus to transmit the response signal from the memory system to the host system.

15. A non-transitory computer-readable storage medium storing instructions that, when executed by a processing device, cause the processing device to:
    receive, via a communication channel coupled between a memory system and a host system, a request for information about available capacity of a buffer in the memory system, wherein the memory system stores in the buffer write commands, received from the host system to store data in memory components of the memory system, before execution of the write commands;
    determine, by a controller of the memory system, an amount of available capacity of the buffer that becomes available as a result of completing at least one write command previously stored in the buffer;
    control a response to the request based at least in part on the amount of available capacity; and
    skip at least one of the plurality of requests.

16. The non-transitory computer-readable storage medium of claim 15, wherein the instructions, when executed by the processing device, further cause the processing device to:
    skip at least one of the plurality of requests in response to a determination that a plurality of requests for information are buffered in the memory system and the amount of available capacity is below a threshold.

17. The non-transitory computer-readable storage medium of claim 15, wherein the instructions, when executed by the processing device, further cause the processing device to:
    delay a period of time before transmitting, from the memory system to the host system, a response signal responsive to the request, in response to a determination that the amount of available capacity is below a threshold.

18. The non-transitory computer-readable storage medium of claim 17, wherein the period of time is based at least in part on an average of previous time periods between receiving information requests and transmitting of response signals for the information requests.

19. The non-transitory computer-readable storage medium of claim 18, wherein each of the response signals for the information requests is transmitted in response to a determination that an available capacity is above the threshold.

20. The non-transitory computer-readable storage medium of claim 15, wherein the write commands are in accordance with a communication protocol for non-volatile dual in-line memory modules; and the communication channel coupled between the memory system and the host system includes:
    a command bus to transmit the write commands;
    a data bus to transmit the data requested to be stored by the write commands; and
    a transaction bus to transmit, from the memory system to the host system, a response signal for the request.

* * * * *